(12) United States Patent
Shealy

(10) Patent No.: US 12,515,777 B2
(45) Date of Patent: Jan. 6, 2026

(54) SHAFT SEAL

(71) Applicant: TIDES MARINE, INC., DeerField Beach, FL (US)

(72) Inventor: Johnny R. Shealy, Hobe Sound, FL (US)

(73) Assignee: TIDES MARINE, INC., DeerField Beach, FL (US)

( * ) Notice: Subject to any disclaimer, the term of this patent is extended or adjusted under 35 U.S.C. 154(b) by 811 days.

(21) Appl. No.: 17/633,094

(22) PCT Filed: Jul. 28, 2020

(86) PCT No.: PCT/US2020/043803
§ 371 (c)(1),
(2) Date: Feb. 4, 2022

(87) PCT Pub. No.: WO2021/025892
PCT Pub. Date: Feb. 11, 2021

(65) Prior Publication Data
US 2022/0332403 A1      Oct. 20, 2022

Related U.S. Application Data

(60) Provisional application No. 62/882,902, filed on Aug. 5, 2019.

(51) Int. Cl.
*F16J 15/36*      (2006.01)
*B63H 23/32*      (2006.01)

(52) U.S. Cl.
CPC ..... *B63H 23/321* (2013.01); *B63H 2023/327* (2013.01); *F16J 15/36* (2013.01)

(58) Field of Classification Search
CPC .............. B63H 23/321; B63H 2023/327; F16J 15/3456; F16J 15/3224; F16J 15/36
See application file for complete search history.

(56) References Cited

U.S. PATENT DOCUMENTS

| | | | | |
|---|---|---|---|---|
| 2,512,749 A | * | 6/1950 | Mccloskey | .............. F16J 15/36 277/393 |
| 3,016,251 A | | 1/1962 | Gilbert | |
| 3,563,555 A | | 2/1971 | Koons | |

(Continued)

FOREIGN PATENT DOCUMENTS

| | | |
|---|---|---|
| DE | 825025 C | 12/1959 |
| EP | 0133073 A3 | 6/1984 |
| GB | 522720 A | 6/1940 |

OTHER PUBLICATIONS

First European Office Action for related European Patent Application No. 20850203.9, dated Apr. 2, 2024, 4 pages.

(Continued)

*Primary Examiner* — Andrew Polay
(74) *Attorney, Agent, or Firm* — Morgan, Lewis & Bockius LLP

(57) ABSTRACT

A shaft seal includes a shaft engaging portion configured to couple to a shaft extending through a wall. The shaft seal includes a flange configured to sealingly engage the wall. The shaft seal includes a body extending between the shaft engaging portion and the flange. The seal is configured to allow radial and axial movement of the shaft relative to the wall while maintaining a seal between the flange and the wall.

23 Claims, 14 Drawing Sheets

(56) References Cited

U.S. PATENT DOCUMENTS

| | | | |
|---|---|---|---|
| 4,188,039 | A | 2/1980 | Krisak et al. |
| 4,403,778 | A | 9/1983 | Shevokas et al. |
| 4,648,605 | A * | 3/1987 | Marsi ................ F16J 15/36 277/391 |
| 5,639,098 | A * | 6/1997 | MacDonald .......... F16J 15/008 277/391 |
| 2008/0194344 | A1 | 8/2008 | Niederhufner |
| 2008/0203673 | A1 | 8/2008 | Kanzaki |
| 2009/0036006 | A1 * | 2/2009 | Kishimoto .......... F16J 15/3456 277/346 |
| 2012/0013076 | A1 | 1/2012 | Takahashi |
| 2017/0219100 | A1 | 8/2017 | Kobayashi |

OTHER PUBLICATIONS

International Search Report and Written Opinion dated Oct. 13, 2020 for International Patent Application No. PCT/US2020/043803, 10 pages.

Supplementary European Search Report issued in corresponding EP Application No. 20850203, dated Jul. 19, 2023, 7 pages.

* cited by examiner

SHAFT SEAL

CROSS REFERENCE TO RELATED APPLICATIONS

This application is a U.S. National Phase of International Application No. PCT/US2020/043803 filed on Jul. 28, 2020, which claims the benefit of U.S. Provisional Patent Application No. 62/882,902 filed Aug. 5, 2019 entitled "Shaft Seal", each of which is incorporated by reference herein in its entirety.

FIELD OF THE INVENTION

The present invention generally relates to a seal and, more particularly, to a shaft seal configured to maintain a seal between the shaft and a housing during rotary and axial movement of the shaft relative to the housing.

BRIEF SUMMARY OF THE INVENTION

In one embodiment there is a shaft seal that comprises a shaft engaging portion configured to couple to a shaft extending through a wall, a flange configured to sealingly engage the wall, and a body extending between the shaft engaging portion and the flange, the seal is configured to allow radial and axial movement of the shaft relative to the wall while maintaining a seal between the flange and the wall.

In some embodiments, the seal is configured to allow simultaneous radial movement and axial movement of the shaft relative to the wall while maintaining the seal between the flange and the wall. In some embodiments, the body is configured to flex as the shaft moves axially. In some embodiments, the body comprises a bellows. In some embodiments, the bellows comprises at least two folds. In some embodiments, the shaft engaging portion is configured to couple to the shaft such that fluid is prevented from flowing between the shaft engaging portion and the shaft.

In some embodiments, the body is positioned between the shaft engaging portion and the flange. In some embodiments, the shaft engaging portion is configured to be rotationally fixed to the shaft such that the body rotates as the shaft rotates. In some embodiments, the flange is configured to rotate relative to the wall as the shaft rotates. In some embodiments, the shaft seal further comprises a housing including the wall, wherein the flange is configured to sealingly engage the wall. In some embodiments, the housing is configured to be coupled to a boat hull.

In some embodiments, the shaft engaging portion is configured to couple to the shaft and the shaft is coupled to a propeller. In some embodiments, the shaft engaging portion, the flange, and the body are a unitary construct. In some embodiments, the seal between the flange and the wall is configured to prevent fluid flow between the flange and the wall. In some embodiments, the flange extends radially further than the shaft engaging portion and the body. In some embodiments, the shaft engaging portion includes a cylindrical inner surface configured to engage the shaft.

In some embodiments, the flange is a first flange configured to sealingly engage a first wall and the body is a first body extending between the first flange and the shaft engaging portion, the shaft seal further comprises a second flange configured to sealingly engage a second wall opposed to the first wall, and a second body extending between the second flange and the shaft engaging portion.

In another embodiment there is a shaft seal that comprises a shaft engaging portion including a cylindrical inner wall defining an opening having a central axis, a flange extending radially away from the central axis further than the shaft engaging portion, and a body extending between the shaft engaging portion and the flange, the body comprising a flexible bellows having at least two folds.

In another embodiment there is a method of coupling a shaft seal to a shaft that comprises engaging a shaft coupled to a propeller and coupling a first shaft seal to the shaft, the first shaft seal comprising a shaft engaging portion rotatingly fixed to the shaft extending through a wall, a flange configured to sealingly engage the wall, and a body configured to allow radial movement and axial movement of the shaft relative to the wall while maintaining a seal between the flange and the wall, wherein coupling the first shaft seal to the shaft includes sealingly engaging the flange on the wall.

In some embodiments, the method further comprises removing an existing seal from the shaft prior to the coupling the first shaft seal to the shaft. In some embodiments the shaft is coupled to a boat and coupling the first shaft seal to the shaft includes coupling the first shaft seal to the shaft while the boat is in water. In some embodiments the method further comprises coupling a second shaft seal to the shaft while the first shaft seal is coupled to the shaft. In some embodiments, the method further comprises removing the first shaft seal from the shaft, and moving the second shaft seal relative to the shaft such that a flange of the second shaft seal sealingly engages the wall.

In some embodiments, the first shaft seal sealingly engages a first side of the wall and the second shaft seal sealingly engages a second side of the wall, the second side of the wall being opposite the first side of the wall. In some embodiments, coupling the first shaft seal to the shaft includes positioning the first shaft seal on the shaft at a predetermined distance from a housing using an alignment tool.

BRIEF DESCRIPTION OF THE SEVERAL VIEWS OF THE DRAWINGS

The following detailed description of embodiments of the shaft seal will be better understood when read in conjunction with the appended drawings of exemplary embodiments. It should be understood, however, that the invention is not limited to the precise arrangements and instrumentalities shown. For example, although not expressly stated herein, features of one or more various disclosed embodiments may be incorporated into other of the disclosed embodiments.

In the drawings.

DETAILED DESCRIPTION OF THE EXEMPLARY EMBODIMENTS OF THE INVENTION

Figure 1:
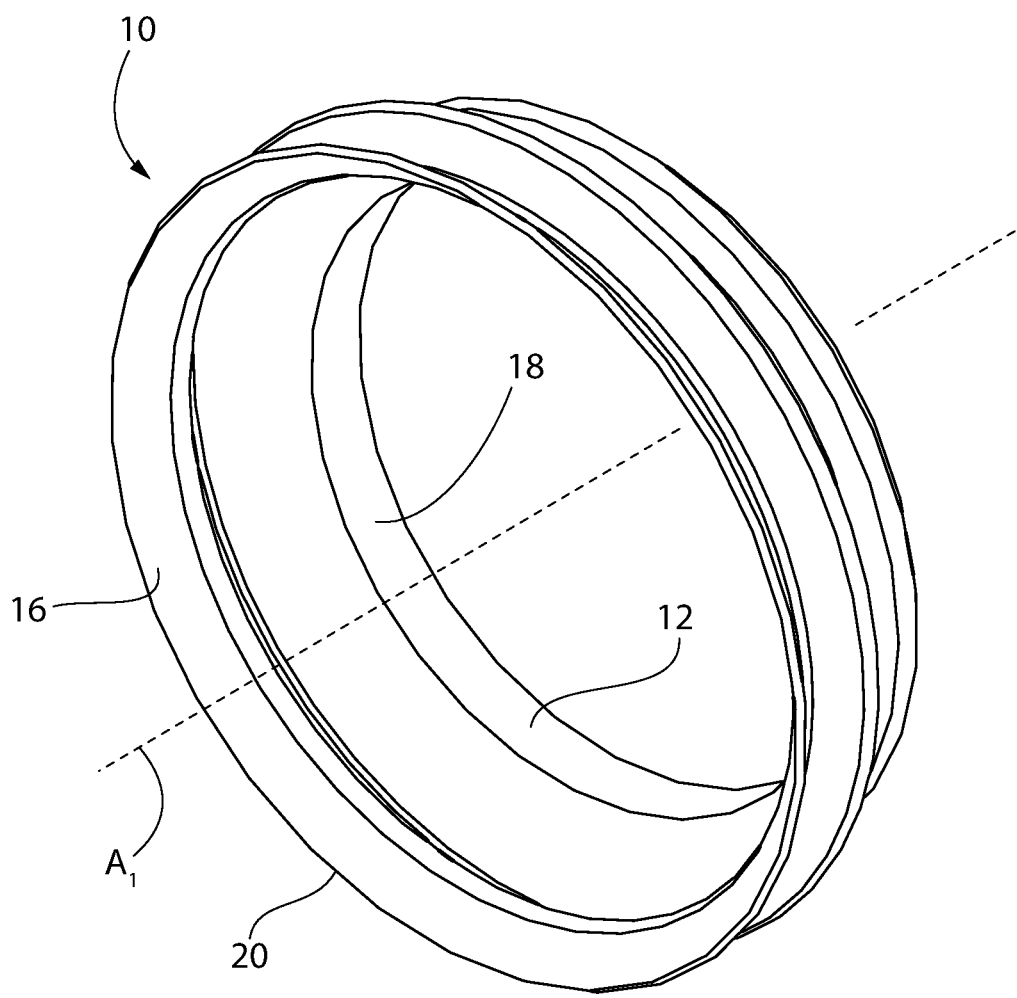
FIG. 1 is a perspective view of a shaft seal in accordance with an exemplary embodiment of the present invention.

Referring to the drawings in detail, wherein like reference numerals indicate like elements throughout, there is shown in FIGS. 1-12 a seal, generally designated 10, in accordance with an exemplary embodiment of the present invention.

Shafts may be used to transfer movement or power from one area to another. For example, a shaft may be used to transfer power from a motor to a propeller. In doing so, the shaft may extend through one or more structures such as fixed walls. Shafts may rotate about an axis and/or translate along an axis to transfer the movement or power. To avoid impeding on the movement of the shaft, the fixed wall may need to be spaced from the shaft. In certain situations, particularly applications involving fluid, dust, or particulates such as boats, water treatment plants, water movement equipment, water control equipment, construction equipment, impellors and propellers, and mixing and brewing equipment, there is a need to seal the shaft relative to the wall. Some seals accommodate rotation of the shaft but do not allow axial translation relative to the wall. Other seals accommodate axial translation of the shaft relative to the wall but do not allow rotation.

Figure 5:
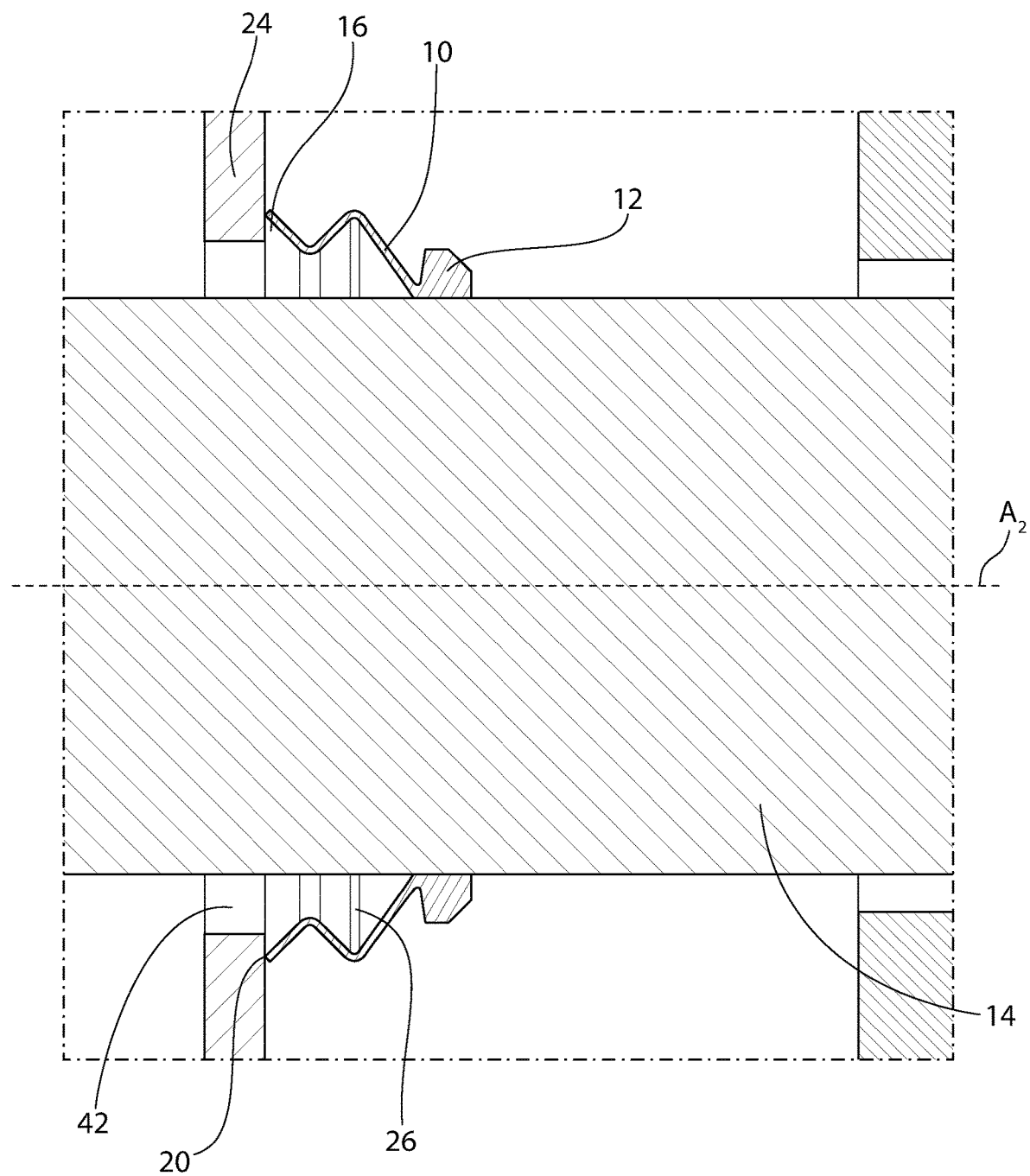
FIG. 5 is a sectional view of the shaft seal of FIG. 1 coupled to a wall and with the shaft seal coupled to a shaft.

Referring to FIGS. 1 and 5, the seal 10 may be configured to maintain a fluid seal between the seal 10 and a shaft 14 (FIG. 5) when the shaft rotates and/or when the shaft 14 moves axially. The seal 10 may include a shaft engaging portion 12 configured to couple to a shaft 14. The shaft engaging portion 12 may couple to the shaft 14 such that a fluid seal is established between the seal 10 and the shaft 14. The shaft engaging portion 12 may be rotationally and axially fixed to the shaft once in place such that the seal 10 rotates and translates as the shaft rotates and translates. The shaft 14 may include a recessed groove or channel (not shown) extending around at least a portion of the circumference of the shaft and the shaft engaging portion 12 may be positioned in the channel.

The seal 10 may include a free end, flange 16, configured to sealingly engage a wall 24 (FIG. 5). The flange 16 may create a seal with the wall 24 while being able to slide rotationally relative to the wall 24 as the shaft 14 rotates about a shaft axis $A_2$. The flange 16 may also slide radially relative to the wall 24 in instances where the shaft 14 shifts radially relative to the wall 24, if at all. The flange 16 may extend radially outwardly from a central axis $A_1$ of the seal 10.

Referring to FIG. 1, the shaft engaging portion 12 may include an inner wall 18 having a shape similar to the outer shape of the shaft. The inner wall 18 may have a cylindrical shape and define an opening having a diameter of about 2 inches, about 2.25 inches, about 2.5 inches, about 2.75 inches, about 3 inches, about 3.25 inches, about 3.5 inches, about 3.75 inches, about 4 inches, about 4.5 inches, about 5 inches, about 5.5 inches, about 6 inches, about 8 inches, about 10 inches, about 12 inches, about 14 inches, about 16 inches about 18 inches, about 20 inches, about 25 inches, about 30 inches, about 35 inches, about 40 inches, more than 40 inches, less than 2 inches, about 2 inches to about 4 inches, about 4 inches to about 6 inches, about 6 inches to about 8 inches, about 8 inches to about 10 inches, about 10 inches to about 12 inches, about 12 inches to about 14 inches, about 14 inches to about 16 inches, about 16 inches to about 18 inches, or about 18 inches to about 20 inches.

The flange 16 may include a rim 20 defining a flange opening which may have a larger diameter than the opening defined by the inner wall 18. The rim 20 may extend radially outwardly further than any other portion of the seal 10. The flange opening may have a diameter of about 2 inches, about 4 inches, about 6 inches, about 8 inches, about 10 inches, about 12 inches, about 14 inches, about 16 inches about 18 inches, about 20 inches, about 25 inches, about 30 inches, about 35 inches, about 40 inches, more than 40 inches, less than 2 inches, about 2 inches to about 4 inches, about 4 inches to about 6 inches, about 6 inches to about 8 inches, about 8 inches to about 10 inches, about 10 inches to about 12 inches, about 12 inches to about 14 inches, about 14 inches to about 16 inches, about 16 inches to about 18 inches, or about 18 inches to about 20 inches. The rim 20 may be configured to maintain a fluid seal with the wall 24 as the shaft 14 rotates and/or moves axially along the shaft axis $A_2$.

The shaft engaging portion 12 may be manufactured from nitrile, fluoroelastomer, polytetrafluoroethylene (PTFE), ethylene propylene, polyacrylate, silicone, neoprene, or a metal with elastomeric covering. In some embodiments, the shaft engaging portion 12 comprises an elastomeric material and the elastomeric properties of the material fixes the shaft engaging portion 12 to the shaft 14. In other embodiments, a garter spring or clamp (not shown) fixes the shaft engaging portion 12 to the shaft 14. In still other embodiments, the shaft engaging portion 12 comprises an elastomeric material and a combination of the elastomeric properties of the material and a garter spring or clamp fixes the shaft engaging portion 12 to the shaft 14. In some embodiments, an adhesive may fix the shaft engaging portion 12 to the shaft 14. The shaft engaging portion 12 may establish a seal with the shaft 14 even if the outer surface of the shaft is not smooth.

The shaft engaging portion 12 may comprise a majority of the seal 10 by volume. In some embodiments, the shaft engaging portion 12 may comprise about 5 percent, about 10 percent, about 15 percent, about 20 percent, or about 25 percent of the volume of the seal 10. The shaft engaging portion 12 may have a thickness $T_1$. The shaft engaging portion may be the thickest part of the seal 10. Thickness $T_1$ may be about 150 percent, about 200 percent, about 300 percent, about 400 percent, about 500 percent, about 750 percent, or about 1,000 percent thicker than another portion of the seal 10.

Figure 3:
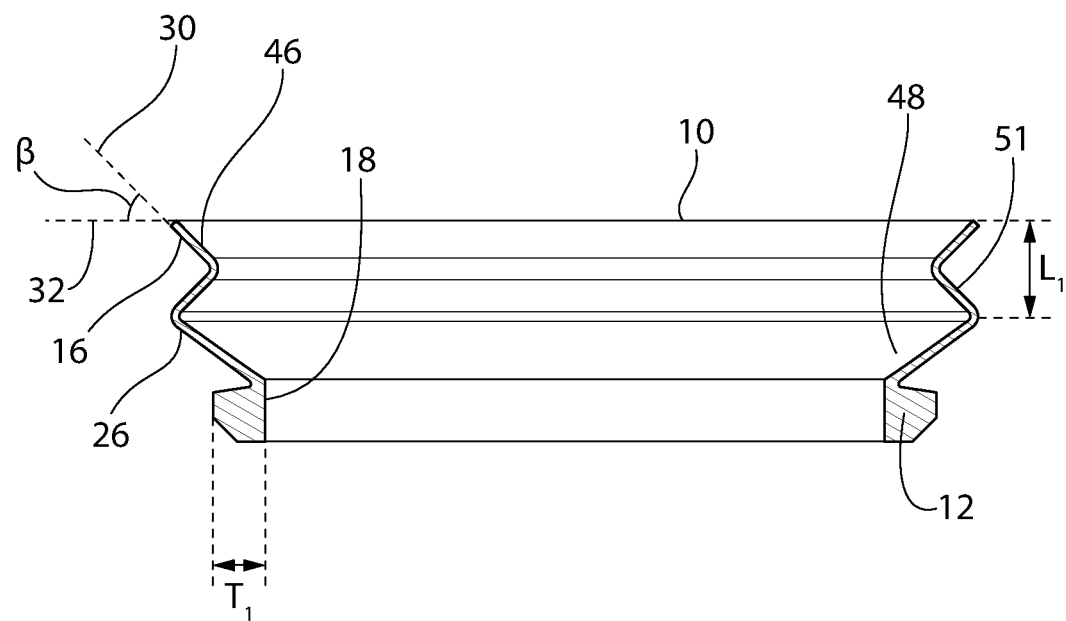
FIG. 3 is a sectional view of the shaft seal of FIG. 1 taken along a plane, the location and direction being indicated by line A-A in FIG. 2.
Figure 4:
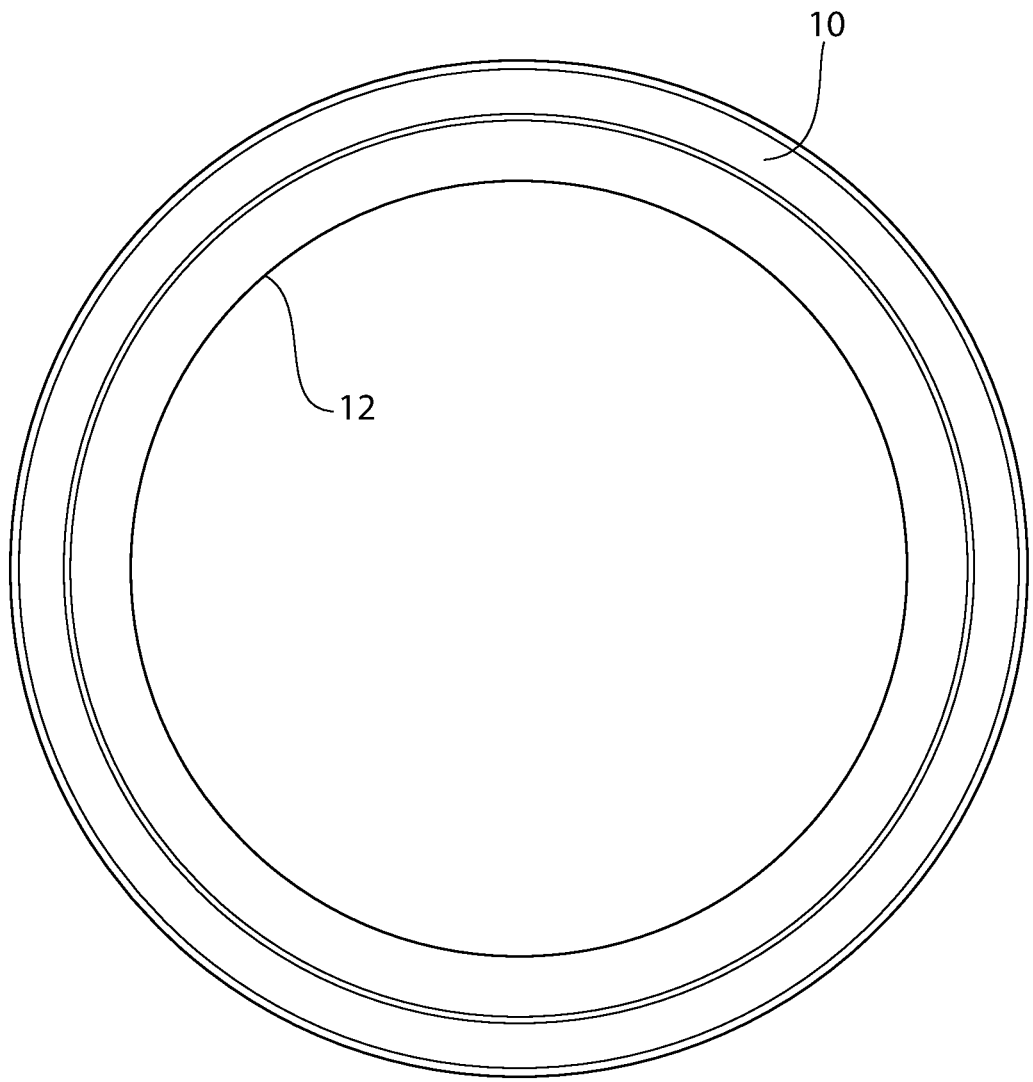
FIG. 4 is a front elevational view of the shaft seal of FIG. 1.

Referring to FIG. 3, a portion of the flange 16 may be generally co-planar with a flange plane 30 and flange plane 30 may intersect a wall plane 32 (the wall plane 32 being generally co-planar with an outer surface of the wall) at an angle β of about 15 degrees, about 20 degrees, about 25 degrees, about 30 degrees, about 35 degrees, about 40 degrees, about 45 degrees, about 50 degrees, about 55 degrees, about 60 degrees, about 65 degrees, about 70 degrees, about 15 to 30 degrees, about 30 to 45 degrees or about 45 to 60 degrees. As the shaft 14 moves axially relative to wall 24, the angle β may increase or decrease by up to about 1 degree, about 3 degrees, about 5 degrees, about 10 degrees, about 15 degrees, about 20 degrees, about 25 degrees, about 30 degrees, or about 35 degrees.

Referring to FIG. 5, the wall 24 may include a wall opening 42 and the shaft 14 may extend through the wall opening 42. In some embodiments, the shaft 14 moves radially relative to axis $A_2$ and the wall 24. For example, the shaft 14 may move radially relative to the wall 24 as the shaft 14 rotates to turn the propeller. The flange 16 may move radially relative to the wall opening 42 while maintaining the seal between the flange 16 and the wall 24. The opening 42 may be larger than the outer diameter of the shaft engaging portion 12 such that the seal 10 can pass through the opening 42 during installation.

Referring to FIG. 5, the rim 20 may define a flange opening that is larger than the wall opening 42 such that the shaft 14 can move radially relative to the wall 24 by a distance of about 1 inch, about 2 inches, about 3 inches, about 4 inches, about 5 inches, about 7 inches, about 10 inches, about 15 inches, about 20 inches, about 25 inches, about 30 inches, about 35 inches, about 40 inches, about 1 inch to 2 inches, about 2 inches to about 4 inches, about 4 inches to 7 inches, about 7 inches to 10 inches, about 10 inches to 15 inches, about 15 inches to 20 inches, about 20 inches to 25 inches, about 25 inches to 30 inches, about 30 inches to 35 inches, or about 35 inches to 40 inches while the flange 16 maintains the seal with the wall 24. The flange 16 may remain at a fixed distance from the shaft axis $A_2$ when the shaft 14 moves radially while maintaining the fluid seal between the flange 16 and the wall 24.

The flange 16 may be manufactured from nitrile, fluoroelastomer, polytetrafluoroethylene (PTFE), ethylene propylene, polyacrylate, silicone, neoprene, or a metal with elastomeric covering. In some embodiments, the flange 16 and the shaft engaging portion 12 are manufactured from the same material. In other embodiments, the flange 16 and the shaft engaging portion 12 are manufactured from different materials. The seal 10 may be exposed to fluid (e.g., water) and the fluid may dissipate any heat generated by the friction between the flange 16 and the wall 24 as the shaft 14 rotates relative to the wall 24.

The seal 10 may include a body 26 coupled to the flange 16 and the shaft engaging portion 12. The body 26 may be configured to flex or resiliently change shape as the shaft 14 moves axially to maintain the seal between the shaft 14 and the shaft engaging portion 12. The body 26 may comprise a bellows having one or more folds 36. A fold 36 may be a section of the seal 10 where the body 26 changes radial direction and allows two adjacent parts of the body 26 to flex toward and away from each other. In some embodiments, the seal 10 may include 1 fold, 2 folds, 3 folds, 4 folds, 5 folds, 6 folds, 7 folds, 8 folds, 9 folds, 10 folds, more than 10 folds, 1 to 5 folds, or 5 to 10 folds.

Figure 2:
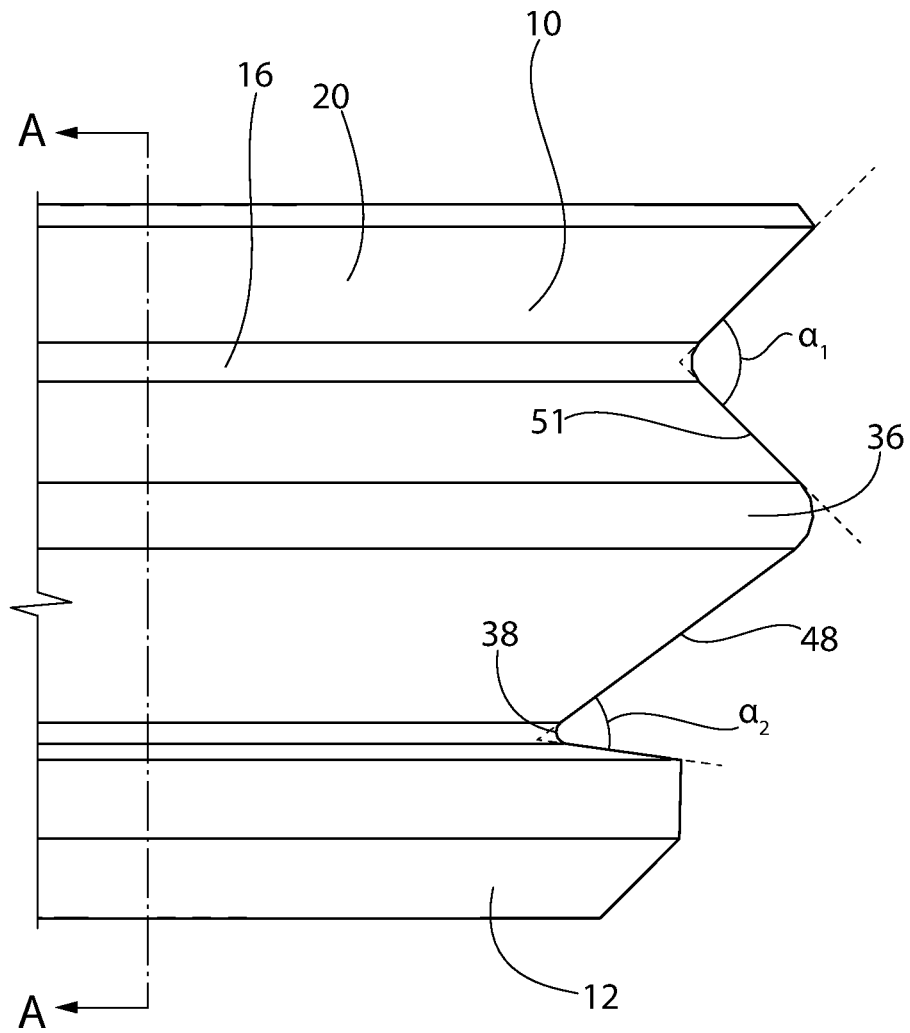
FIG. 2 is a top plan view of a portion of the shaft seal of FIG. 1.

Referring to FIG. 2, the folds 36 may be at an angle $\alpha_1$ relative to at least one of the flange 16 and another fold 36. The angle $\alpha_1$ may be about 15 degrees, about 20 degrees, about 25 degrees, about 30 degrees, about 35 degrees, about 40 degrees, about 45 degrees, about 50 degrees, about 55 degrees, about 60 degrees, about 65 degrees, about 70 degrees, about 15 to 30 degrees, about 30 to 45 degrees or about 45 to 60 degrees. The angle $\alpha_1$ between folds 36 closer to the flange 16 may be larger than the angle between folds closer to the shaft engaging portion 12. In some embodiments, the folds 36 near the flange 16, and therefore the wall 24, collapse first. In other embodiments, the folds 36 near the flange 16 collapse last. In some embodiments, at least one of the folds 36 has a different spring rate than another of the folds.

The body 26 may be manufactured from nitrile, fluoroelastomer, polytetrafluoroethylene (PTFE), ethylene propylene, polyacrylate, silicone, neoprene, or a metal with elastomeric covering. The body 26 may be manufactured from a first material and the shaft engaging portion 12 may be manufactured from a second material. The first material may be different from the second material. The first material may be at least one of stiffer, harder, and more adhesive than the second material. The first material may include aramid fibers. The second material may be at least one of smoother, more flexible, and more high temp resistant than the first material. The second material may be nitinol or rubber. The seal 10 may be manufactured using a two shot mold process.

Referring to FIGS. 2 and 3, a radially inwardly pointing section 46 of the fold 36 may have a diameter that is greater than a diameter of the inner wall 18 of the shaft engaging portion 12 when the seal 10 is in an initial state. In some embodiments, the seal 10 is in an initial state when the seal 10 is not coupled to the shaft 14 or when no compressive or elongation load is applied to the seal 10. The radially inwardly pointing section 46 may have a diameter that is greater than a diameter of the shaft 14 when a compressive or elongation load is applied to the seal 10 such that the inwardly pointing section 46 does not contact the shaft 14. The radially inwardly pointing section 46 may have a diameter that is at least about 5 percent, about 10 percent, about 15 percent, about 20 percent, about 25 percent, about 30 percent, or about 35 percent greater than the diameter of inner wall 18 or the shaft 14 such that the radially inwardly pointing section 46 does not contact the shaft 14 as the seal 10 flexes axially. A first leg 48 of the folds 36 (e.g., the portion of the fold closest to shaft engaging portion 12) may have a length that is greater than a length of a second leg 51.

The body 26 may be configured to allow axial movement of the shaft 14 while maintaining a seal with the wall 24. The body 26 may be configured to accommodate axial movement of the shaft 14 relative to the wall 24 of a distance up to about 0.25 inches, about 0.375 inches, about 0.5 inches, about 0.75 inches, about 1 inch, about 1.5 inches, about 2 inches, about 2.5 inches, about 3 inches, about 3.5 inches, about 4 inches, about 4.5 inches, about 5 inches, about 0.25 to about 0.5 inches, about 0.5 to about 1 inch, about 1 inch to 2 inches, about 2 to 3 inches, about 3 to 4 inches, or about 4 to 5 inches. The body 26 may provide a spring force when compressed. The spring force of the body 26 may force the flange 16 into contact with the wall 24, thereby creating the fluid seal between the flange 16 and the wall 24, even when the shaft 14 moves axially. The body 26 may have a spring force such that the seal between the flange 16 and the wall 24 is maintained even when the shaft 14 moves axially at high speeds.

The shaft engaging portion 12, the body 26, and the flange 16 may be a unitary construct. The flange 16 and the body 26 may have a length $L_1$ (FIG. 3) when the seal 10 is in the initial state. Axial movement of the shaft may cause the seal 10 to elongate and/or compress such that the length $L_1$ changes by up to about 5 percent, about 10 percent, about 15 percent, about 20 percent, about 25 percent, about 30 percent, about 35 percent, about 40 percent, about 45 percent, about 50 percent, about 60 percent, about 70 percent, about 80 percent, about 90 percent, or about 100 percent of the length $L_1$ as the shaft 14 moves axially. In some embodiments, the body 26 compresses or expands only when the shaft 14 moves axially.

In some embodiments, the body 26 expands or contracts uniformly. In other embodiments, only a first portion (e.g., a top, bottom, or side) of the body 26 expands or contracts while a second portion remains in its initial state or expands or contracts by a different amount than the first portion. In this way, the seal 10 maintains a fluid seal between the flange 16 and the wall 24 even if the shaft 14 tilts relative to the opening in the wall 24.

Figure 6:
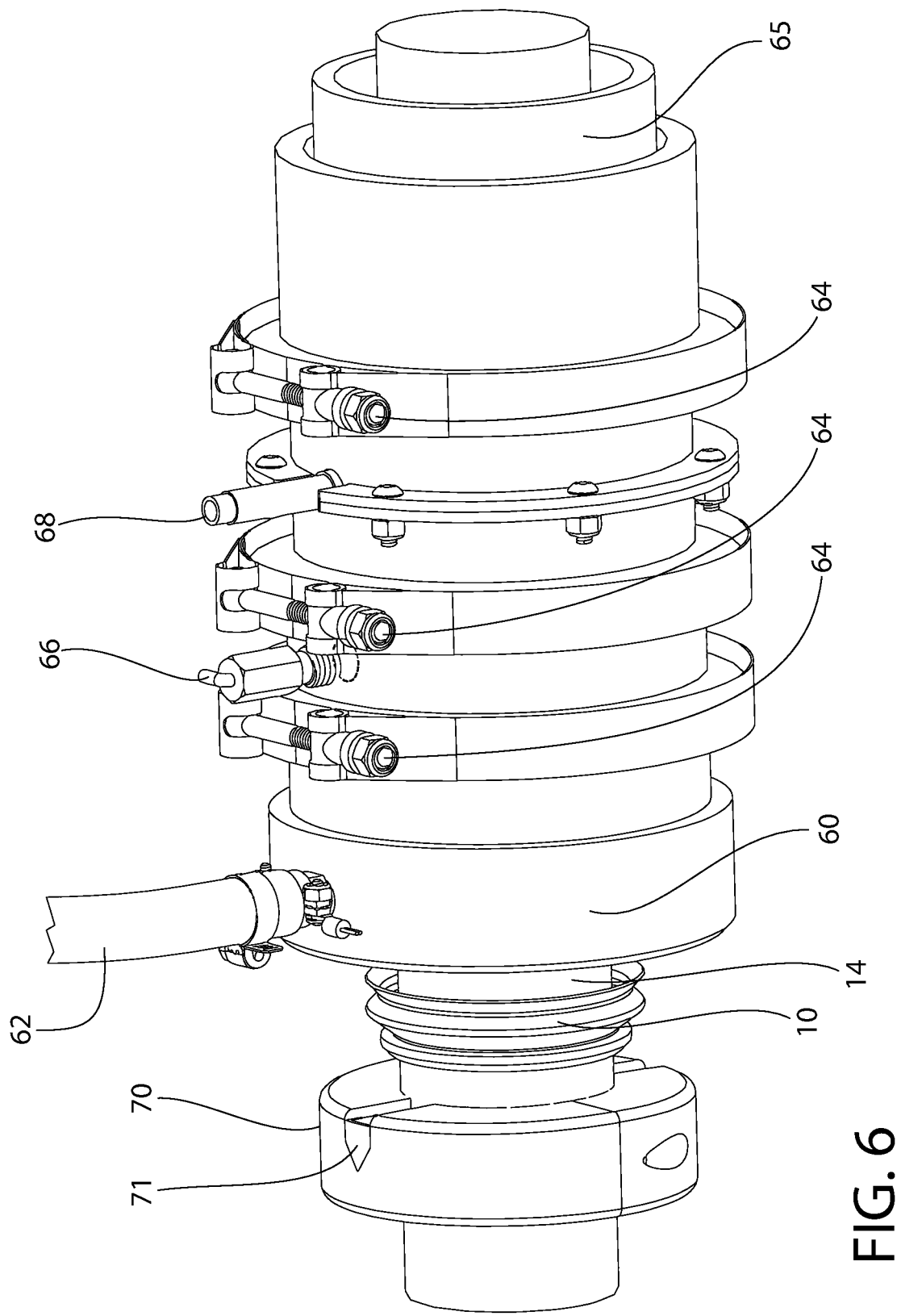
FIG. 6 is a perspective view of a housing which includes the shaft seal of FIG. 1 in accordance with an exemplary embodiment of the present invention.
Figure 7:
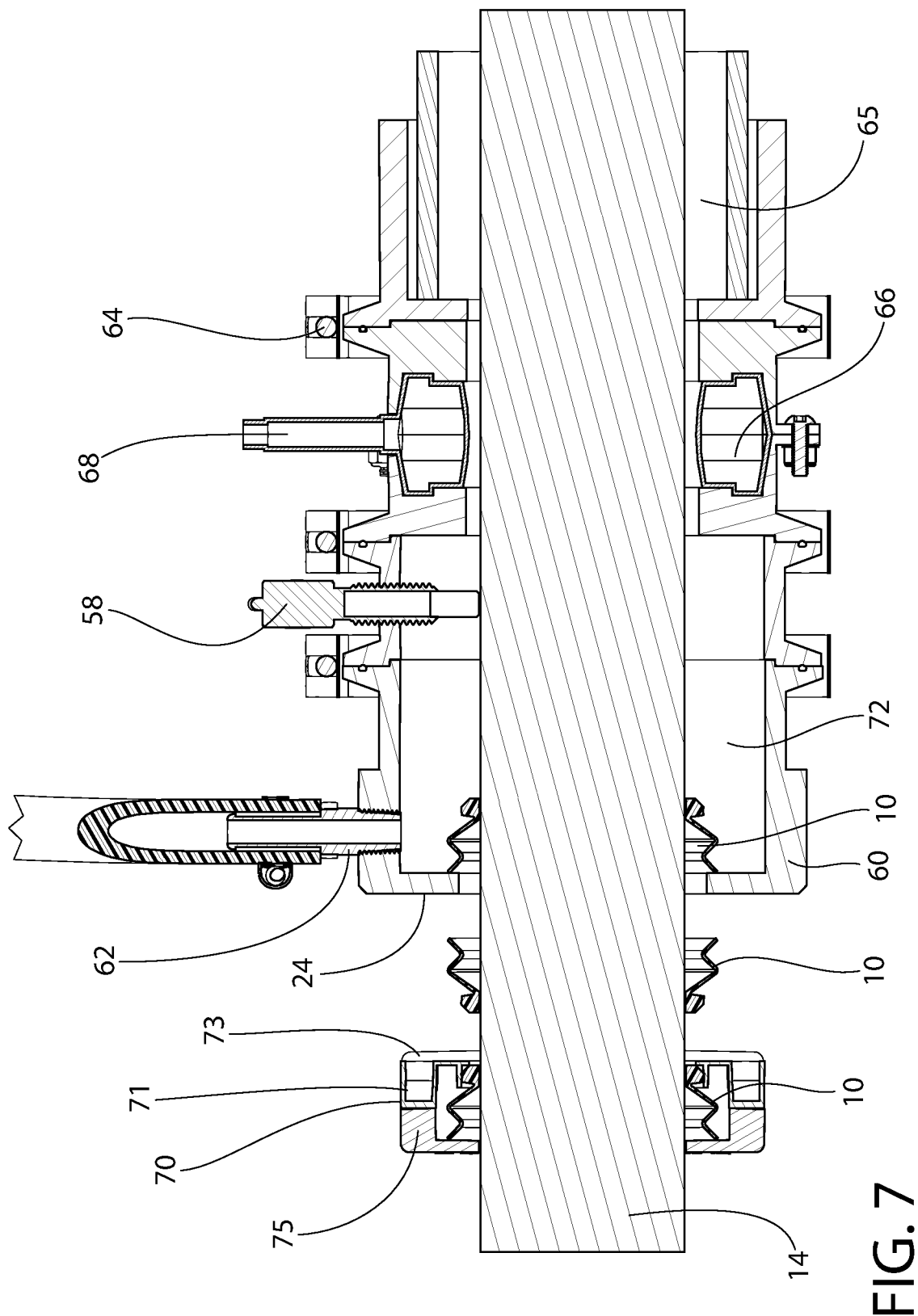
FIG. 7 is a sectional view of the housing of FIG. 6.

Referring to FIGS. 5-7, the wall 24 may be part of a housing 60 that receives the shaft 14 and the seal 10. In some embodiments, a kit includes the seal 10 and the housing 60. The housing 60 may include an inlet 62 such that the housing 60 can be filled with fluid to secure the flange 16 against the wall 24. The flange 16 may be secured against the wall 24 by both the spring force of the body 26 and fluid contained within the housing 60. The seal 10 may be configured to not deform under the pressure of the fluid contained within the housing 60 such that the flange 16 would be deformed radially inward toward the shaft. The circular shape of the seal 10, along with the stiffness of the materials used to manufacture the seal 10, may prevent the flange 16 from being deformed by the pressure of the fluid contained within housing 60. The wall 24 may be detachably coupled to the housing 60. The fluid pressure within the housing may be about 3 psi, about 5 psi, about 7 psi, about 10 psi, about 12 psi, about 15 psi, about 5-10 psi, about 8-13 psi, or about 10-15 psi.

Still referring to FIGS. 5-7, the housing 60 may include a plurality of sections coupled together by one or more clamps 64. In another embodiment, the housing 60 may be comprised of a single unitary component. The housing 60 may include a cavity 72 (FIG. 7) configured to receive and house the seal 10. The cavity 72 may be sized to house more than one seal 10 such that replacing the seal only requires a user to move a second seal axially along the shaft 14 to engage wall 24, as explained in greater detail below. In one embodiment, the housing 60 is coupled to a boat hull and the shaft 14 is coupled to a propeller. In other embodiments, the seal 10 is coupled to a shaft 14 in a water treatment plant, water movement equipment, water control equipment, construction equipment, impellors and propellers, fluid pump, food mixer, liquid mixer (e.g., in a brewery), mixer, or other application where a shaft rotates at less than 1,500 rpm.

One of the plurality of sections of the housing 60 may include a grounding element 58 coupled to the shaft 14 to reduce corrosion of components (e.g., the shaft, bearings, or propeller) from electrolysis. The grounding element 58 may be coupled to the shaft 14 by a ground element housing 90. The ground element housing 90 may be modular to allow for the grounding element 58 to be coupled to or decoupled from the shaft 14. The grounding element 58 may include a wire electrically coupled to an existing electrical ground (e.g., the existing electrical ground of a boat). Another of the plurality of sections of the housing 60 may include an expandable bladder 66. The expandable bladder 66 may extend circumferentially around the shaft 14. Air or fluid may be introduced into the bladder through a bladder inlet 68 to expand the bladder. The bladder 66 may form a fluid seal with the shaft 14 when the shaft 14 is stationary such that the seal 10 can be replaced while maintaining a fluid seal between the housing 60 and the shaft 14. The air or fluid introduced into the bladder 66 may be released through the inlet 68 once the seal has been replaced, such that the bladder 66 no longer forms a fluid seal with the shaft 14. An engagement portion 65 may be coupled to the housing 60. The engagement portion may engage a stern tube of a boat.

Figure 13:
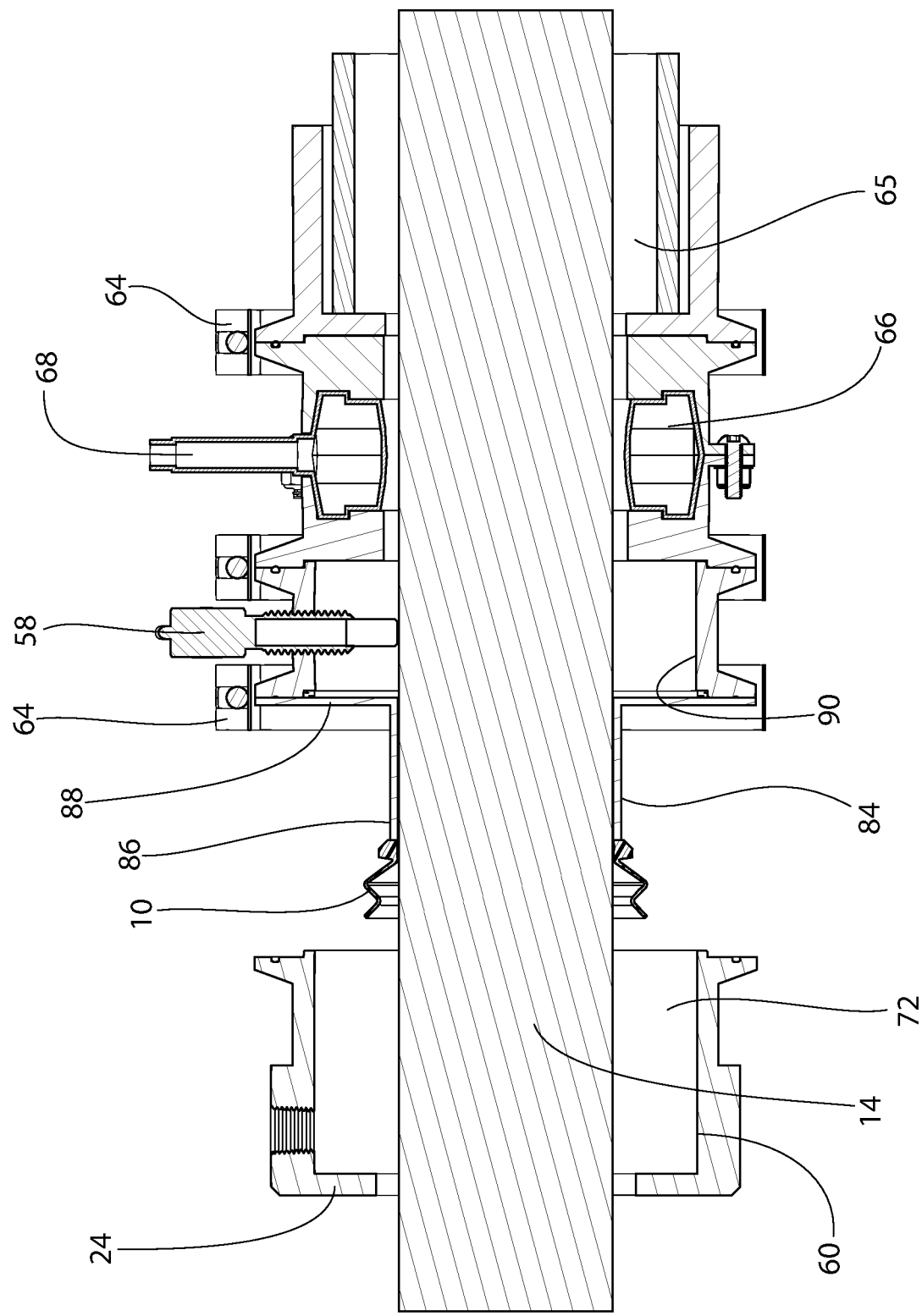
FIG. 13 is a sectional view of the partially exploded housing of FIG. 6 with a seal alignment tool in accordance with an exemplary embodiment of the present invention coupled to the shaft.

Referring to FIG. 13, it may be desirable to position the seal 10 on the shaft 14 at a predetermined distance from a portion of the housing 60 (e.g., away from the ground element housing 90) such that when the housing 60 is coupled to the ground element housing 90, the seal 10 forms a fluid seal with the wall 24 of the housing 60. A seal alignment tool 84 may be configured to position the seal 10 at a predetermined distance from a portion of the housing. The seal alignment tool 84 may include a housing engagement portion 88. The housing engagement portion 88 may extend away from the shaft 14 and abut the portion of the housing that housing 60 will be coupled to. In some embodiments, the housing engagement portion 88 couples to the portion of the housing (e.g., via magnet, adhesive, or with the clamp 64).

Still referring to FIG. 13, the seal alignment tool 84 may include a spacer arm 86. The spacer arm 86 may engage a portion of the shaft 14. The seal alignment tool 84 may at least partially wrap around the shaft 14. The seal alignment tool 84 may wrap around the shaft 14 and couple to itself (e.g., via snap fit or fastener). The axial length of the spacer arm 86 may be selected based on the axial length of the housing 60. The seal 10 may be positioned against an end of the spacer arm 86 and the seal alignment tool 84 may be removed. In some embodiments, the seal alignment tool 84 is reusable. In other embodiments, the seal alignment tool 84 is intended for single use. The seal alignment tool 84 may be manufactured from plastic. The seal alignment tool 84 may include a frangible portion such that the seal alignment tool 84 can be removed from the shaft 14. In some embodiments, the seal alignment tool 84 is removed from the shaft without the use of tools. In other embodiments, the seal alignment tool 84 is cut or scored before removing.

Referring to FIGS. 6-7, a seal carrier 70 may be coupled to the shaft 14. A seal 10 (e.g., a spare seal) may be housed within the seal carrier 70. The seal carrier 70 may protect the seal 10 before the seal 10 is coupled to the housing 60. The seal carrier 70 may include an indicator 71 (e.g., a visual indicator such as an arrow) to indicate which direction the seal 10 within the seal carrier 70 is facing. The seal carrier 70 may be rotationally fixed to the shaft 14. The seal carrier 70 may be axially fixed to the shaft 14. The seal carrier 70 may include a first piece 73 and a second piece 75. The first piece 73 may be coupled to the second piece 75 (e.g., via snap fit, adhesive, or fastener). The first piece 73 may be detached from the second piece 75 while the seal 10 is coupled to the shaft 14. The seal carrier 70 may be coupled to the shaft 14 while the shaft 14 is transferring power.

Figure 9:
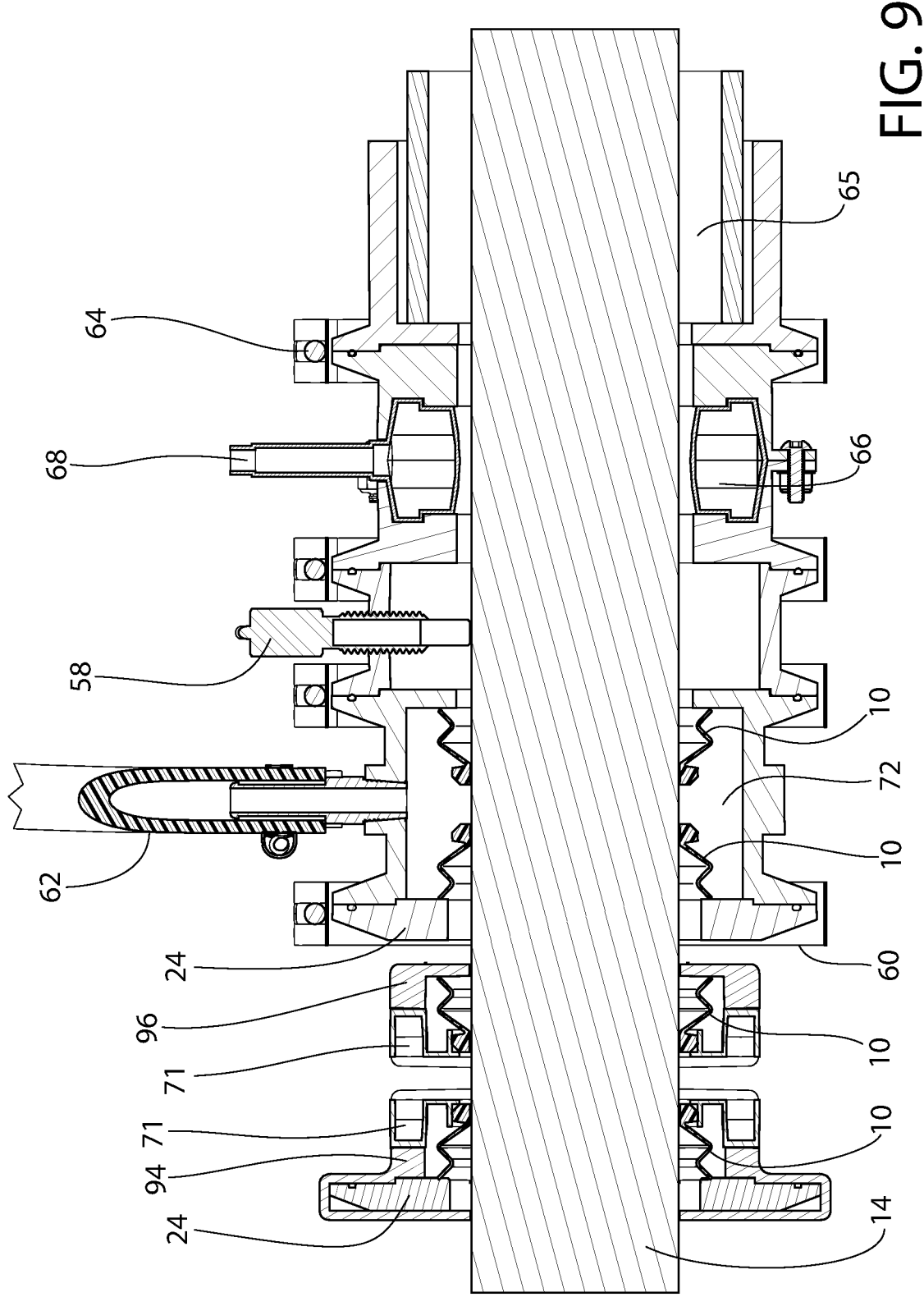
FIG. 9 is a sectional view of the housing of FIG. 6 with two shaft seals therein and a first seal carrier and a second seal carrier in accordance with an exemplary embodiment of the present invention coupled to the shaft.

Referring to FIG. 9, more than one seal 10 may be positioned in the cavity 72 of the housing 60. A first seal 10 may face a first direction and a second seal 10 may face the opposition direction. Each of the first seal 10 and the second seal 10 may engage the shaft 14 and an inner surface of the housing 60 such that the cavity 72 is sealed. A first seal carrier 94 may be positioned on the shaft 14 facing a first direction. The wall 24 may be detachable from the housing 60 and the first seal carrier 94 may include a spare wall 24, an O-ring, and seal 10. A second seal carrier 96 may include a seal 10 and be positioned on the shaft 14 facing a second direction. The first direction may be opposite the second direction. The indicator 71 may indicate which direction the seal inside the seal carrier is facing. The first seal carrier 94 and the second seal carrier 96 may face opposite directions such that both seals 10 within the cavity 72 of the housing 60 can be replaced as desired.

Figure 10:
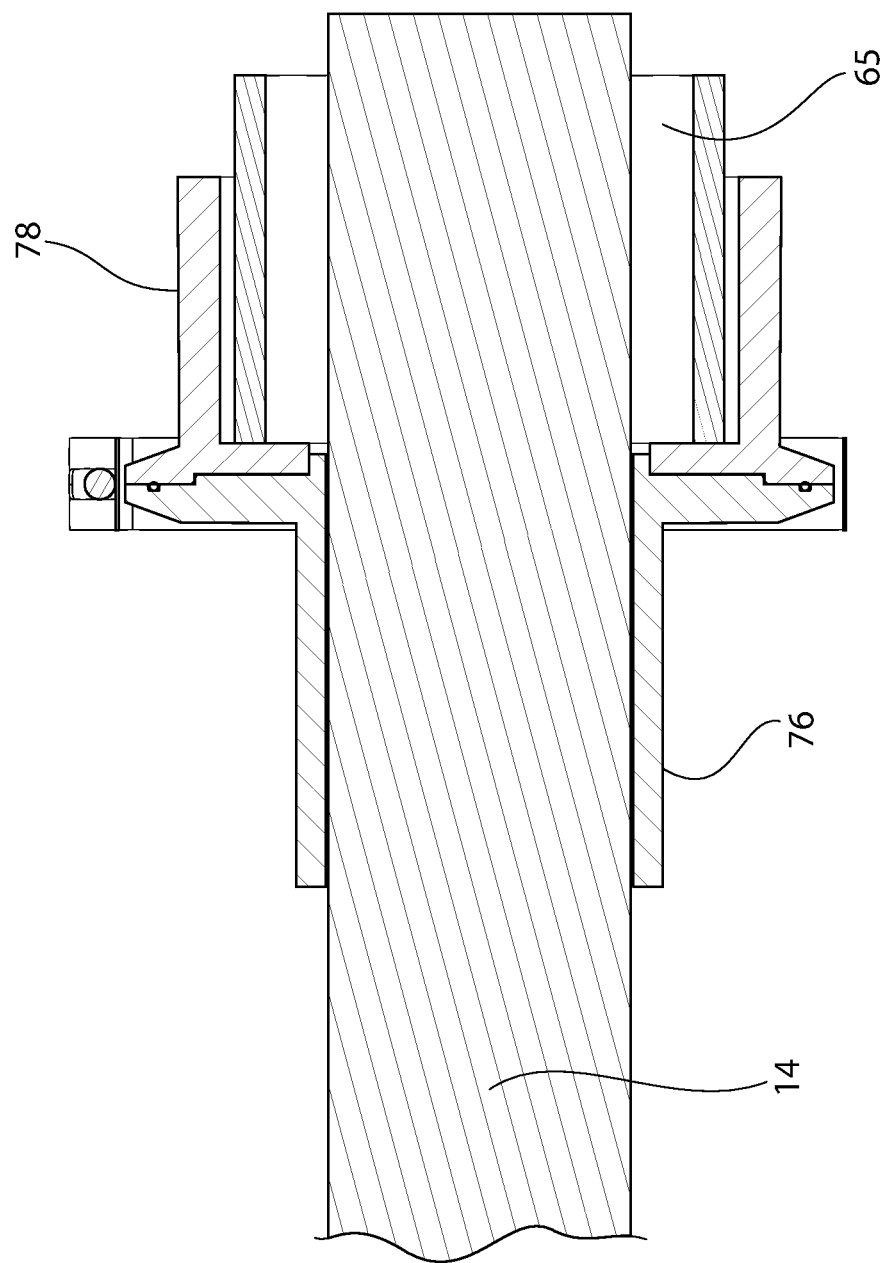
FIG. 10 is a sectional view of an alignment tool in accordance with an exemplary embodiment of the present invention coupled to a shaft.

Referring to FIG. 10, an alignment tool 76 may be used for aligning the backend housing 78 to the existing stern tube 65 when retrofitting to an existing boat. The backend housing 78 is clamped to the alignment tool 76 and slid down the shaft 14 and over the stern tube 65. This insures that the backend housing is concentric to the shaft 14. Once in place, the backend housing 78 can be bonded to the stern tube 65 and hull, for example, using bonding materials for fiberglass. The alignment tool 76 can then be removed from shaft 14.

Figure 11:
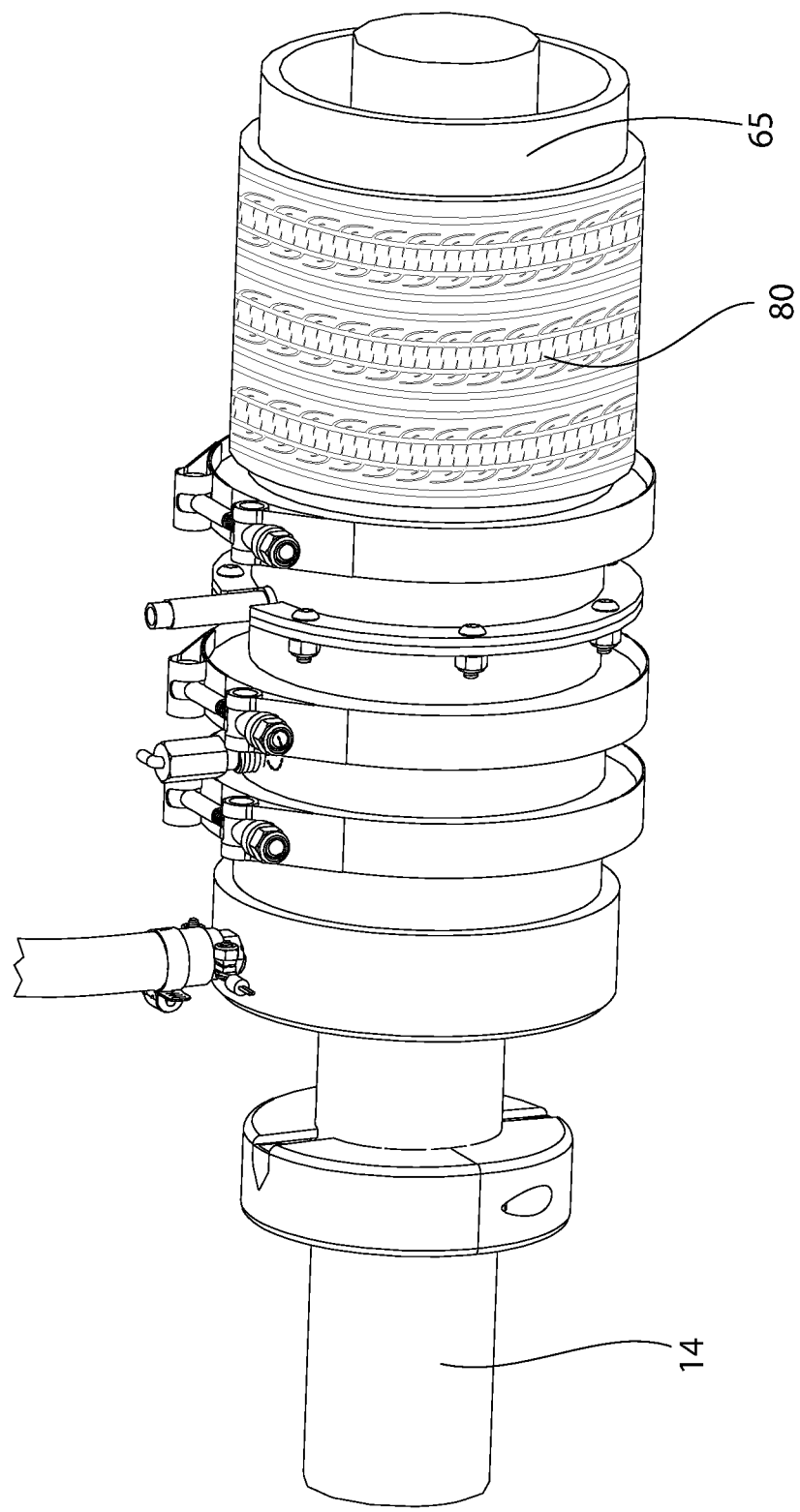
FIG. 11 is a perspective view of a housing which includes the shaft seal of FIG. 1 in accordance with an exemplary embodiment of the present invention.
Figure 12:
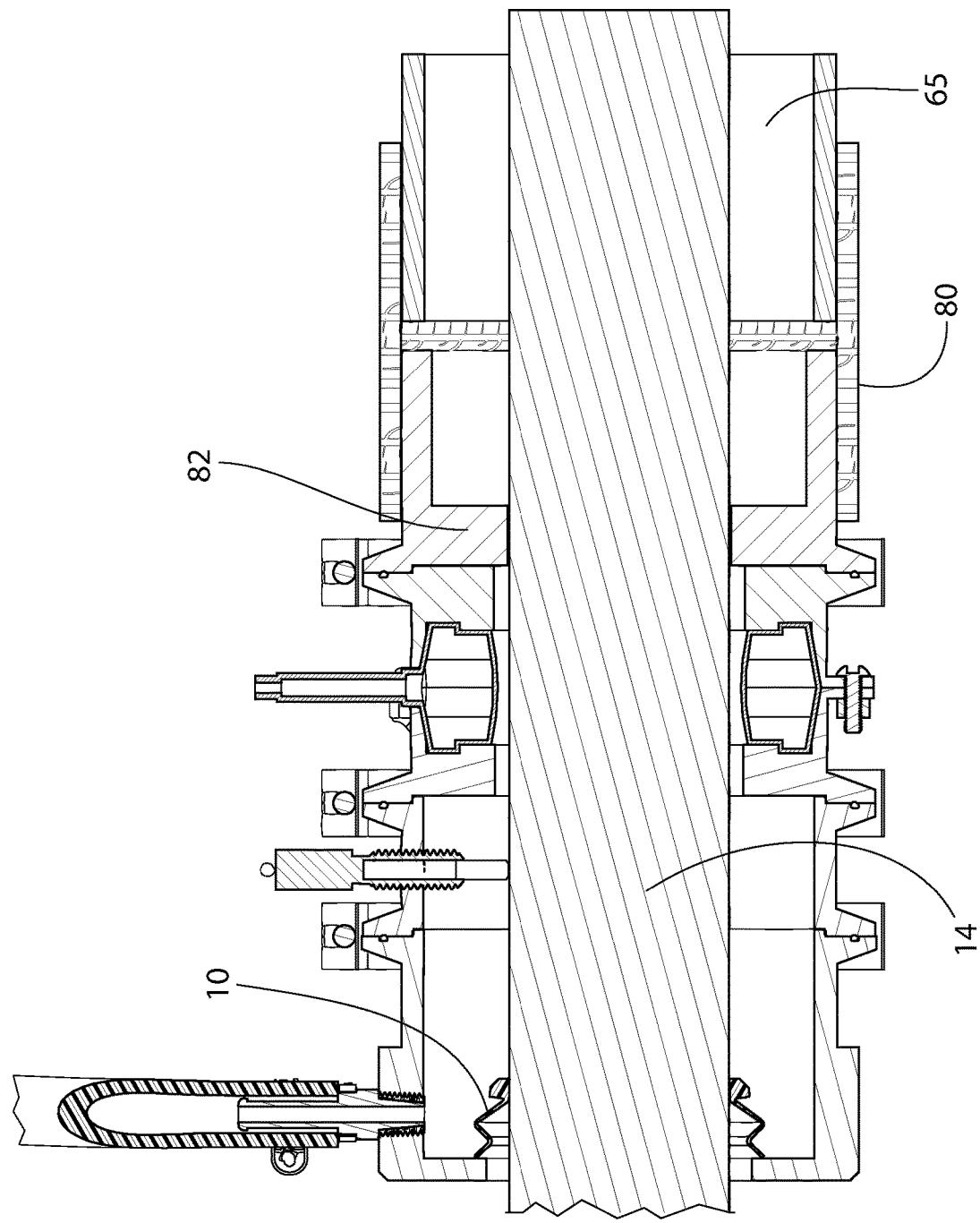
FIG. 12 is a sectional view of the housing of FIG. 11.

Referring to FIGS. 11-12, a hose 80 may take the place of the backend housing to make the connection to the stern tube 65 in applications where the hose 80 would be the simple or preferred method for that application. The hose 80 would be fastened and sealed to the stern tube 65 and housing with two hose clamps on either side (not shown). A support bearing 82 may be provided to help align the housing assembly relative to the shaft 14.

Figure 14:
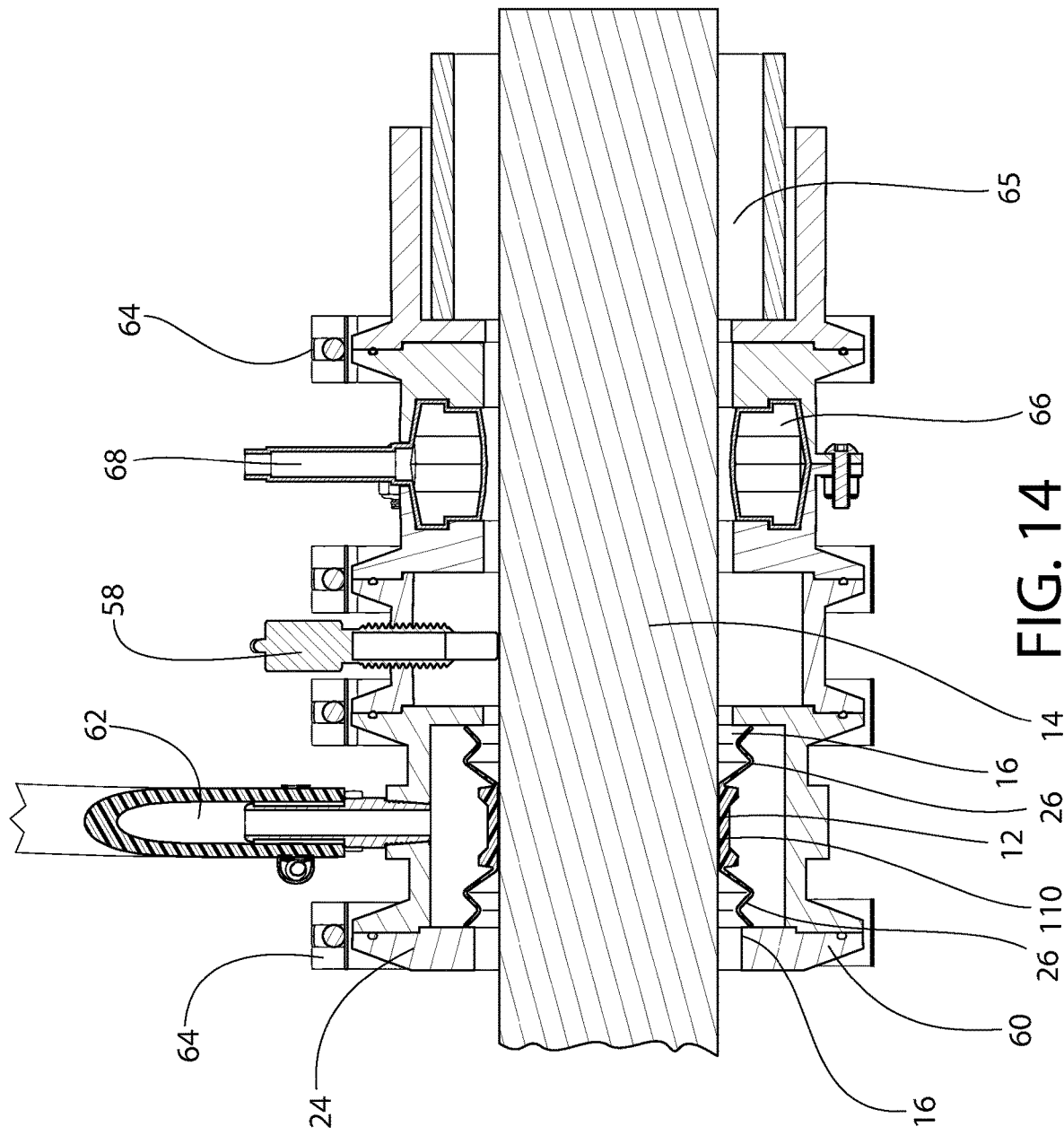
FIG. 14 is a sectional view of the housing of FIG. 6 with a seal in accordance with another exemplary embodiment of the present invention therein.

Referring to FIG. 14, there is shown a second embodiment of the seal, generally designated 110. The seal 110 is similar to the first embodiment of the seal 10 except that the seal 110 includes two flanges 16. Each of the flanges 16 may be configured to engage a sidewall of the housing 60 on opposing sides. The seal 110 including a shaft engaging portion 12 between the two flanges 16. The seal 110 may include two body portions 26, each extending between the shaft engaging portion 12 and the flanges 16, such that the seal 110 maintains a fluid seal with the sidewall of the housing 60 during axial or radial movement of the shaft 14. The seal carrier 70 may include a spare seal 110 such that the seal 110 may be replaced without decoupling the shaft 14 from other elements (e.g., the motor or propeller).

A method of providing a seal between a shaft 14 and a wall 24 during axial and radial movement of the shaft may include coupling the shaft engaging portion 12 of the seal 10 to the shaft 14. The method may include sealingly engaging the flange 16 on the wall 24. The method may include removing an existing seal from the shaft 14 prior to coupling the shaft engaging portion 12 to the shaft 14. The method may include moving the shaft 14 radially, axially, or both, while maintaining the fluid seal between the seal 10 and the shaft 14 and between the seal 10 and the wall 24.

Figure 8:
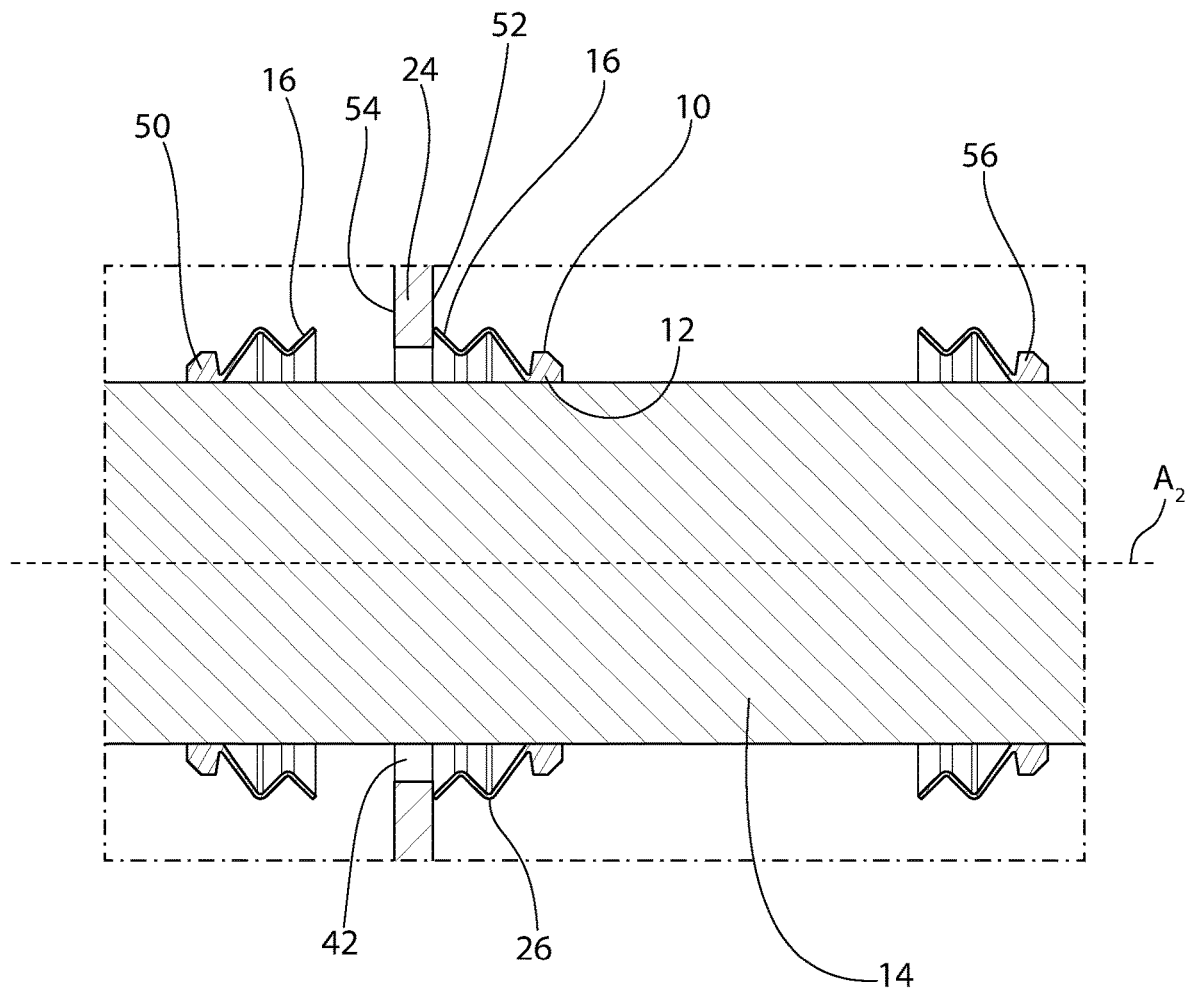
FIG. 8 is a sectional view of two of the shaft seals of FIG. 1 coupled to a shaft with one of shaft seals coupled to a wall.

The method may include positioning a housing about the shaft 14 such that the seal 10 engages a wall of the housing. The method may include using an alignment tool 84 to align the seal 10 on the shaft 14 relative to a portion of the housing. Referring to FIG. 8, the method may include coupling a plurality of seals 10 to the shaft 14. The method may include engaging the wall 24 with a first seal 10 of the plurality of seals. The method may include removing the first seal 10 and engaging the wall 24 with a second seal 50 of the plurality of seals. The second seal 50 may be moved along the shaft 14 to engage the wall 24 while the shaft 14 is coupled to a motor and output (e.g., a propeller). The shaft 14 may be in a boat and the second seal 50 of the plurality of seals may be moved along the shaft 14 to engage the wall 24 while the boat is in water. The first seal 10 may be coupled to the shaft 14 and engaged with the wall 24 while the second seal 50 is coupled to the shaft 14 but spaced from the wall 24 such that the second seal 50 can be quickly moved along the shaft 14 into engagement with the wall 24 when desired.

Referring to FIG. 8, the first seal 10 may be positioned on a first side of the wall 24 (e.g., within the housing) and the second seal 50 may be positioned on a second side of the wall 24 (e.g., outside of the housing). The flange 16 of the first seal 10 may engage a first side 52 of the wall 24. A third seal 56 may be coupled to the shaft 14 on the same side of the wall 24 as the first seal 10. The second seal 50 and third seal 56 may be spare seals. Spare seals installed on the shaft 14 may be helpful to prevent having to remove equipment at an end of the shaft 14 when replacing first seal 10.

Referring to FIG. 8, when the first seal 10 needs to be replaced, the method may include moving the second seal 50 such that the flange 16 of the second seal 50 engages a second side 54 of the wall 24 to provide a temporary seal with the shaft 14. The method may include removing the first seal 10 (e.g., by cutting seal 10). The method may include moving the third seal 56 along the shaft 14 such that the flange 16 of the third seal 56 engages the wall 24 (e.g., first side 52 of wall 24). A tool (not shown) may be used to determine how far to space the shaft engaging portion 12 of the third seal 56 from the wall 24.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

What is claimed is:

1. A shaft seal comprising:
   a shaft engaging portion configured to couple to a shaft extending through a wall;
   a flange configured to sealingly engage the wall; and
   a body rotatably fixed to the shaft engaging portion such that rotation of the shaft engaging portion causes the body to rotate with the shaft engaging portion, the body extending between the shaft engaging portion and the flange,
   wherein the shaft seal is configured to allow radial and axial movement of the shaft relative to the wall while maintaining a seal between the flange and the wall, and
   wherein the flange extends radially further than the shaft engaging portion and the body.

2. The shaft seal of claim 1, wherein the body comprises a bellows.

3. The shaft seal of claim 2, wherein the bellows comprises at least two folds.

4. The shaft seal of claim 1, wherein the shaft engaging portion is configured to be rotationally fixed to the shaft such that the shaft engaging portion and the body rotate as the shaft rotates.

5. The shaft seal of claim 4, wherein the flange is rotatably fixed to the body such that rotation of the body causes the flange to rotate relative to the wall as the shaft rotates.

6. The shaft seal of claim 1 further comprising:
a housing including the wall, wherein the flange is configured to sealingly engage the wall.

7. The shaft seal of claim 6, wherein the housing is configured to be coupled to a boat hull.

8. The shaft seal of claim 1, wherein the seal is configured to allow simultaneous radial movement and axial movement of the shaft relative to the wall while maintaining the seal between the flange and the wall.

9. The shaft seal of claim 1, wherein the body is configured to flex as the shaft moves axially.

10. The shaft seal of claim 1, wherein the shaft engaging portion is configured to couple to the shaft such that fluid is prevented from flowing between the shaft engaging portion and the shaft.

11. The shaft seal of claim 1, wherein the body, the shaft engaging portion and the flange are a unitary construct.

12. A shaft seal comprising:
a shaft engaging portion configured to couple to a shaft extending through a wall;
a flange configured to sealingly engage the wall; and
a body rotatably fixed to the shaft engaging portion such that rotation of the shaft engaging portion causes the body to rotate with the shaft engaging portion, the body extending between the shaft engaging portion and the flange,
wherein the shaft seal is configured to allow radial and axial movement of the shaft relative to the wall while maintaining a seal between the flange and the wall,
wherein the flange is a first flange configured to sealingly engage a first wall and the body is a first body extending between the first flange and the shaft engaging portion, the shaft seal further comprising:
a second flange configured to sealingly engage a second wall opposed to the first wall; and
a second body extending between the second flange and the shaft engaging portion.

13. A shaft seal comprising:
a shaft engaging portion including a cylindrical inner wall defining an opening having a central axis;
a flange extending radially away from the central axis; and
a body extending between the shaft engaging portion and the flange, the body comprising a flexible bellows having at least two folds, the body being rotatably fixed to the shaft engaging portion such that rotation of the shaft engaging portion causes the body to rotate with the shaft engaging portion,
wherein the shaft engaging portion, flange and body are a unitary construct,
wherein the flange extends radially further from the central axis than the shaft engaging portion and the body.

14. A method of coupling a shaft seal to a shaft comprising:
coupling a shaft engaging portion of a first shaft seal to be rotatably fixed to a shaft that extends through a wall and is coupled to a propeller; and
engaging a flange of the shaft seal against the wall such that a seal between the flange and the wall is formed,
wherein the shaft seal includes a body extending from the shaft engaging portion to the flange, the body being rotatably fixed to the shaft engaging portion such that rotation of the shaft engaging portion causes the body to rotate with the shaft engaging portion, the body configured to allow radial movement and axial movement of the shaft relative to the wall while maintaining a seal between the flange and the wall.

15. The method of claim 14 further comprising:
coupling a second shaft seal to the shaft while the first shaft seal is coupled to the shaft.

16. The method of claim 15 further comprising:
removing the first shaft seal from the shaft; and
moving the second shaft seal relative to the shaft such that a flange of the second shaft seal sealingly engages the wall.

17. The method of claim 16, wherein the first shaft seal sealingly engages a first side of the wall and the second shaft seal sealingly engages a second side of the wall, the second side of the wall being opposite the first side of the wall.

18. The method of claim 14, wherein coupling the first shaft seal to the shaft includes positioning the first shaft seal on the shaft at a predetermined distance from a housing using an alignment tool.

19. The method of claim 18, wherein sealingly engaging the flange on the wall includes coupling the wall to the housing after the first shaft seal is positioned on the shaft.

20. The method of claim 14 further comprising:
removing an existing seal from the shaft prior to the coupling the first shaft seal to the shaft.

21. The method of claim 14, wherein the shaft is coupled to a boat and the coupling the first shaft seal to the shaft includes coupling the first shaft seal to the shaft while the boat is in water.

22. A method of coupling a shaft seal to a shaft comprising:
engaging a shaft coupled to a propeller;
coupling a first shaft seal to the shaft, the first shaft seal comprising:
a shaft engaging portion rotatably fixed to the shaft extending through a wall;
a flange configured to sealingly engage the wall; and
a body configured to allow radial movement and axial movement of the shaft relative to the wall while maintaining a seal between the flange and the wall,
coupling a second shaft seal to the shaft while the first shaft seal is coupled to the shaft;
removing the first shaft seal from the shaft; and
moving the second shaft seal relative to the shaft such that a flange of the second shaft seal sealingly engages the wall,
wherein coupling the first shaft seal to the shaft includes sealingly engaging the flange on the wall.

23. A method of coupling a shaft seal to a shaft comprising:
engaging a shaft coupled to a propeller;
coupling a first shaft seal to the shaft, the first shaft seal comprising:
a shaft engaging portion rotatably fixed to the shaft extending through a wall;
a flange configured to sealingly engage the wall; and
a body configured to allow radial movement and axial movement of the shaft relative to the wall while maintaining a seal between the flange and the wall, coupling a second shaft seal to the shaft while the first shaft seal is coupled to the shaft,
wherein coupling the first shaft seal to the shaft includes sealingly engaging the flange on the wall, and
wherein the shaft is coupled to a boat and the coupling the first shaft seal to the shaft includes coupling the first shaft seal to the shaft while the boat is in water.

* * * * *